Patented July 5, 1938

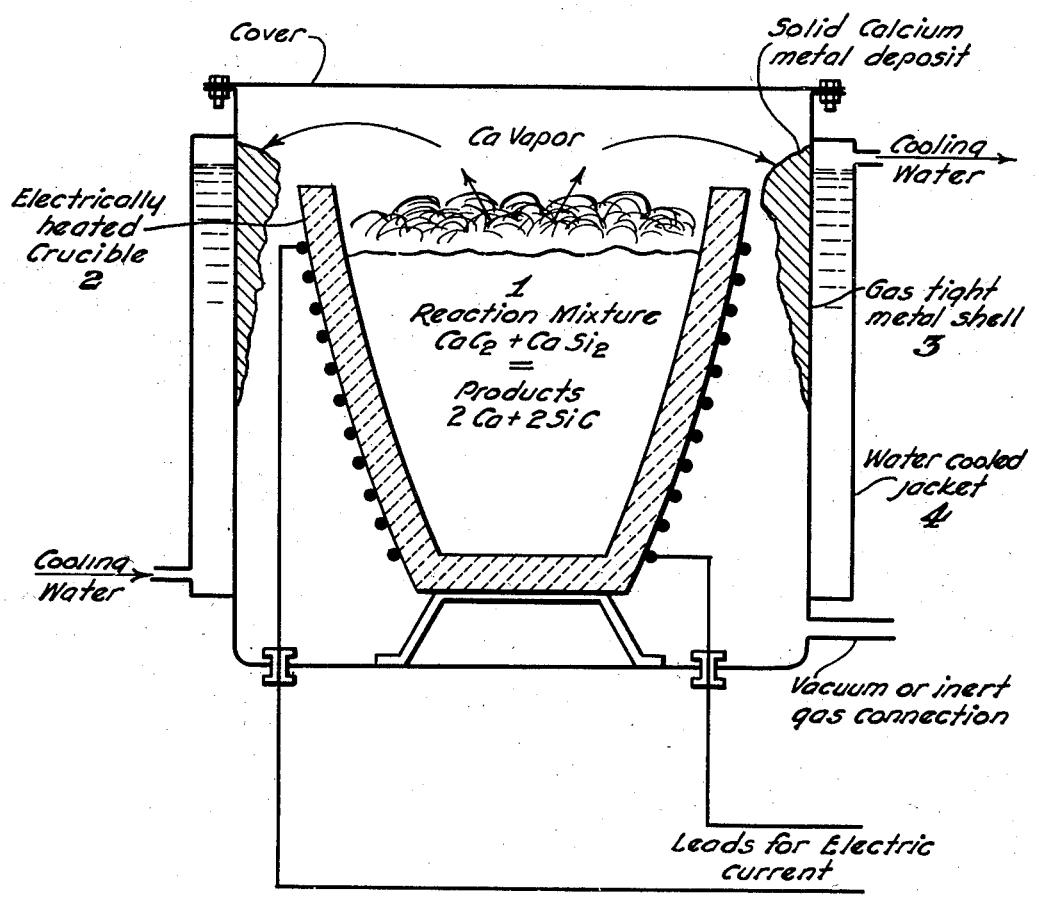

2,122,446

UNITED STATES PATENT OFFICE 2,122,446

MANUFACTURE OF CALCIUM METAL

Louis E. Ward, Midland, Mich., assignor to The Dow Chemical Company, Midland, Mich., a corporation of Michigan Application August 11, 1936, Serial No. 95,461

7 Claims. (Cl. 75—67)

The invention relates to an improved method of making calcium metal.

I have discovered that by heating a mixture of calcium carbide and calcium silicide to a sufficient temperature these materials react, liberating metallic calcium. The reaction occurs apparently at above about 1150° C. and at a temperature between about 1350° and 1600° C. proceeds smoothly and rapidly.

The drawing illustrates diagrammatically the apparatus in which the method is practiced.

In carrying out the reaction the materials are first finely ground, if necessary, and then intimately mixed, preferably in approximately the proportions of one mole of $CaC_2$ for each two moles of silicon in the calcium silicide. The mixture is placed in a suitable vessel, and heated to reaction temperature at sub-atmospheric pressure, or in an atmosphere of an inert gas, such as helium. The metal is liberated from the reaction mass as a vapor and may be condensed upon a suitable cooled surface, e. g. iron or steel. For example, referring to the drawing the mixture 1 of calcium carbide and calcium silicide may be placed in an electrically heated crucible 2 of a material preferably non-reactive to calcium vapor, such as carborundum, which is surrounded by a gas tight metal shell 3, the shell being provided with the water cooled jacket 4 so as to act as a condensing surface for the vaporized calcium. A graphite reaction vessel, although reactive to calcium, may be used in place of a carborundum vessel provided the calcium vapor evolved is immediately condensed on a condensing surface placed in close proximity to the reaction mass. The product is obtained in substantially pure form.

The following example is illustrative of one mode of carrying out the invention:—5 pounds of commercial calcium carbide (containing 75.8% of $CaC_2$) and 5 pounds of calcium silicide (containing 28.5% of Ca, the balance being largely silicon), both powdered, were mixed together and the mixture was placed in an open graphite vessel surrounded by a water-cooled vacuum-tight steel jacket in close proximity to the vessel. The interior of the jacket was maintained during the reaction at a pressure of about 0.1 mm. of mercury by means of a vacuum pump. The temperature of the mixture was raised to between 1350° and 1600° C. by passing an electric current through the graphite vessel. During the heating operation calcium vapor was evolved from the mixture and condensed on the inner surface of the jacket in bright crystals which were substantially pure calcium. The yield was 2.6 pounds of metal. The residue in the reaction vessel was largely silicon carbide in the form of a free-flowing powder.

Other modes of applying the principle of my invention may be employed instead of those explained, change being made as regards the method herein disclosed, provided the step or steps stated by any of the following claims or equivalent of such stated step or steps be employed.

I therefore particularly point out and distinctly claim as my invention:—

1. In a method of making metallic calcium, the step which consists in heating a mixture of calcium carbide and calcium silicide to a temperature capable of liberating calcium.

2. In a method of making metallic calcium, the step which consists in heating a mixture of calcium carbide and calcium silicide to a temperature above 1150° C.

3. In a method of making metallic calcium, the step which consists in heating a mixture of calcium carbide and calcium silicide to a temperature between 1350° and 1600° C.

4. In a method of making metallic calcium, the steps which consist in heating a mixture of powdered calcium carbide and calcium silicide under reduced pressure to a temperature above 1150° C., whereby calcium vapor is evolved, and condensing the vapor.

5. In a method of making metallic calcium, the steps which consist in heating a mixture of powdered calcium carbide and calcium silicide under reduced pressure to a temperature between 1350° and 1600° C., whereby calcium vapor is evolved, and condensing the vapor.

6. In a method of making metallic calcium, the steps which consist in heating a mixture of powdered calcium carbide and calcium silicide in an inert gas to a temperature above 1150° C., whereby calcium vapor is evolved, and condensing the vapor.

7. In a method of making metallic calcium, the steps which consist in heating a mixture of powdered calcium carbide and calcium silicide in an inert gas to a temperature between 1350° and 1600° C., whereby calcium vapor is evolved, and condensing the vapor.

LOUIS E. WARD.